(12) United States Patent
Poeluev et al.

(10) Patent No.: US 10,387,681 B2
(45) Date of Patent: Aug. 20, 2019

(54) METHODS AND APPARATUS FOR CONTROLLING ACCESS TO SECURE COMPUTING RESOURCES

(71) Applicants: Yuri Poeluev, Waterloo (CA); Zhigang Luo, Vaughan (CA)

(72) Inventors: Yuri Poeluev, Waterloo (CA); Zhigang Luo, Vaughan (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 73 days.

(21) Appl. No.: 15/463,470

(22) Filed: Mar. 20, 2017

(65) Prior Publication Data

US 2018/0268127 A1  Sep. 20, 2018

(51) Int. Cl.
*G06F 21/62* (2013.01)
*G06F 21/53* (2013.01)

(52) U.S. Cl.
CPC .......... *G06F 21/6281* (2013.01); *G06F 21/53* (2013.01)

(58) Field of Classification Search
CPC .............................. G06F 21/6281; G06F 21/53
USPC ........................................................ 726/18
See application file for complete search history.

(56) References Cited

U.S. PATENT DOCUMENTS

| 5,761,669 | A * | 6/1998 | Montague | G06F 21/604 707/758 |
| 8,171,252 | B2 * | 5/2012 | Ingels | G06Q 20/341 707/785 |
| 8,291,468 | B1 * | 10/2012 | Chickering | H04L 63/0884 709/227 |
| 8,402,511 | B2 * | 3/2013 | Neal-Joslin | H04L 63/08 713/164 |
| 8,438,654 | B1 * | 5/2013 | von Eicken | G06F 21/53 709/217 |
| 8,832,811 | B2 * | 9/2014 | Horman | G06F 21/31 713/155 |
| 8,904,552 | B2 * | 12/2014 | Mo | G06F 21/57 711/164 |
| 9,219,725 | B2 * | 12/2015 | Chhabra | G06F 9/44526 |
| 9,590,964 | B1 * | 3/2017 | Bortz | H04L 63/08 |
| 9,967,284 | B2 * | 5/2018 | Diaz-Tellez | G06F 21/6218 |
| 2005/0182958 | A1 * | 8/2005 | Pham | G06F 21/51 726/22 |
| 2005/0268336 | A1 * | 12/2005 | Finnegan | G06F 21/31 726/15 |

(Continued)

FOREIGN PATENT DOCUMENTS

| CN | 104484625 A | 4/2015 |
| EP | 1811387 A1 | 7/2007 |

OTHER PUBLICATIONS

SeCReT (Month: Feb.) (Year: 2015).*

*Primary Examiner* — Taghi T Arani
*Assistant Examiner* — Badridot Champakesanatusptodotgov
(74) *Attorney, Agent, or Firm* — Norton Rose Fulbright Canada LLP

(57) ABSTRACT

A computing device has first and second operating systems with access to first and second memories, respectively. The second memory is provided for secure computing resources and is not accessible by applications in the first operating system. A software module executable within the first operating system receives requests for secure computing resources, adds access credentials and passes the requests to a software module in the second operating system.

17 Claims, 10 Drawing Sheets

(56) References Cited

U.S. PATENT DOCUMENTS

| | | | |
|---|---|---|---|
| 2006/0123005 A1* | 6/2006 | Burnett | G06F 21/6218 |
| 2007/0156693 A1* | 7/2007 | Soin | G06F 21/604 |
| 2007/0180517 A1* | 8/2007 | Rhelimi | G06F 21/6218 726/20 |
| 2008/0022376 A1* | 1/2008 | Ke | G06F 21/53 726/5 |
| 2009/0172328 A1* | 7/2009 | Sahita | G06F 12/1491 711/163 |
| 2012/0239936 A1* | 9/2012 | Holtmanns | H04L 9/3213 713/176 |
| 2014/0250521 A1* | 9/2014 | Gallardo | G06F 21/70 726/16 |
| 2014/0372503 A1* | 12/2014 | Wang | G06F 16/1734 709/201 |
| 2015/0006581 A1* | 1/2015 | Luo | G06F 21/6218 707/783 |
| 2015/0143508 A1* | 5/2015 | Halibard | G06F 9/24 726/18 |
| 2015/0220709 A1* | 8/2015 | Jung | G06F 21/45 713/155 |
| 2016/0330177 A1* | 11/2016 | Singleton, IV | H04L 63/0435 |
| 2017/0286701 A1* | 10/2017 | Kim | G06F 21/604 |
| 2018/0203805 A1* | 7/2018 | Hatta | G06F 9/45558 |

* cited by examiner

METHODS AND APPARATUS FOR CONTROLLING ACCESS TO SECURE COMPUTING RESOURCES

FIELD

This relates to computing devices, and in particular, to systems and methods for managing access to secure resources in computing devices.

BACKGROUND

Modern computing devices are used for a wide variety of purposes, many of which involve data that is private, proprietary or sensitive to the user or to other entities. For example, devices such as smart phones are often used to store financial data such as account numbers, payment credentials, biometric data such as fingerprints, PINs and passwords. In addition, computing devices commonly store encryption keys and the like, for example, for playback of copy-protected media. Such data is valuable to users and to other entities such as software developers, enterprises, financial institutions and media owners and publishers.

Protection of sensitive data (in particular, against unauthorized access to such data) is important. Moreover, allowing for fast and convenient access to data for legitimate purposes by both users and software developers is also important for providing a broad feature set of devices. Unfortunately, existing approaches to management of secure data tend to be cumbersome and often have vulnerabilities.

SUMMARY

An example computing device comprises: a processor configured to provide: a first operating system with access to a first memory; and a second operating system with access to a second memory for secure computing resources, the second memory not accessible by applications in the first operating system. The computing device further comprises a first software module executable within the first operating system for receiving access requests to access the secure computing resources and passing the access requests to the second operating system after adding access credentials; a second software module executable within the second operating system for receiving the access requests with access credentials and selectively passing the requests to the secure computing resources in dependence on the access credentials.

In some embodiments, the access requests comprise requests for return of secure data.

In some embodiments, the access requests comprise requests to perform operations using the secure resources. In some embodiments, the first data structure contains access credentials corresponding to applications in the first operating system, and wherein the first software module is configured to add access credentials to each one of the access requests, based on an application from which the request originated.

In some embodiments, the access credentials comprise a value assigned to the application at the time of installation.

In some embodiments, the value is an identification value generated at the time of installation.

In some embodiments, the access credentials comprise a group value assigned to a group of applications.

In some embodiments, the computing device comprises a second data structure defining access requirements for the secure computing resources, wherein the second software module is configured to compare the access credentials in the access requests to the access requirements.

In some embodiments, the secure computing resources comprise trusted applications in the second operating system and the second data structure includes access requirements corresponding to each the trusted application.

In some embodiments, the first and second data structures include access credentials assigned to client applications in the first operating system at the time of installation, the first data structure defining relationships between each the client application and corresponding access credentials, and wherein the access requirements comprise ones of the access credentials.

In some embodiments, the first software module comprises a driver.

In some embodiments, the first operating system defines a rich execution environment and the second operating system defines a trusted execution environment, each as defined by the Global Platform TEE system architecture.

Another example computing device, comprises: a processor; a first operating system with access to a first memory; a second operating system with access to a second memory, the second memory for secure computing resources and not accessible by applications in the first operating system; a first software module executable within the first operating system for receiving access requests to access the secure computing resources and passing the access requests to the second operating system after adding access credentials; a second software module executable within the second operating system for receiving the access requests with access credentials and selectively passing the requests to the secure computing resources in dependence on the access credentials.

Computing devices disclosed herein may include the above features in any combination.

An example method of access control on a computing device with a first operating system and a second operating system having secure resources comprises, at a first software module in the first operating system: receiving a request for a secure resource from an application in the first operating system; adding access credentials to the request; and passing the request with the access credentials to the second operating system. The method comprises, at a second software module in the second operating system: receiving the request with access credentials; comparing the access credentials with access requirements for the secure resource; and selectively passing the requests to the resource if the credentials match the requirements.

In some embodiments, the request comprises a request for return of data from a secure resource.

In some embodiments, the request comprises a request to perform an operation using a secure resource.

In some embodiments, the adding access credentials comprises adding access credentials corresponding to an application from which the access request originated.

In some embodiments, the method comprises assigning access credentials to applications in the first operating system at the time of installation.

In some embodiments, the assigning access credentials comprises generating an identification value associated with each of the applications.

In some embodiments, the assigning access credentials comprises assigning a group value to a group of applications.

In some embodiments, the secure computing resources comprise trusted applications in the second operating system, each with corresponding access requirements and the comparing comprises reading a data access requirements corresponding to each the trusted application.

In some embodiments, the method comprises assigning access credentials to applications in the first operating system at the time of installation and writing the access credentials to a first data structure defining relationships between the applications and the access credentials, and to a second data structure defining access requirements of the trusted computing resources, wherein the access requirements comprise ones of the access credentials.

In some embodiments, the first software module comprises a driver and the receiving the access request comprises receiving a function call to the driver.

Methods disclosed herein may include the above features in any combination.

An example computer-readable medium has instructions thereon for execution by a processor. The instructions comprise: a first software module for execution in a first operating system, for: receiving an access request for a secure resource from an application in the first operating system; adding access credentials to the request; and passing the access requests to the second operating system; a second software module for execution in a the second operating system, for: receiving the access request with access credentials; comparing the access credentials with access requirements for the secure resource; and selectively passing the requests to the resource if the credentials match the requirements.

DETAILED DESCRIPTION

Figure 1:
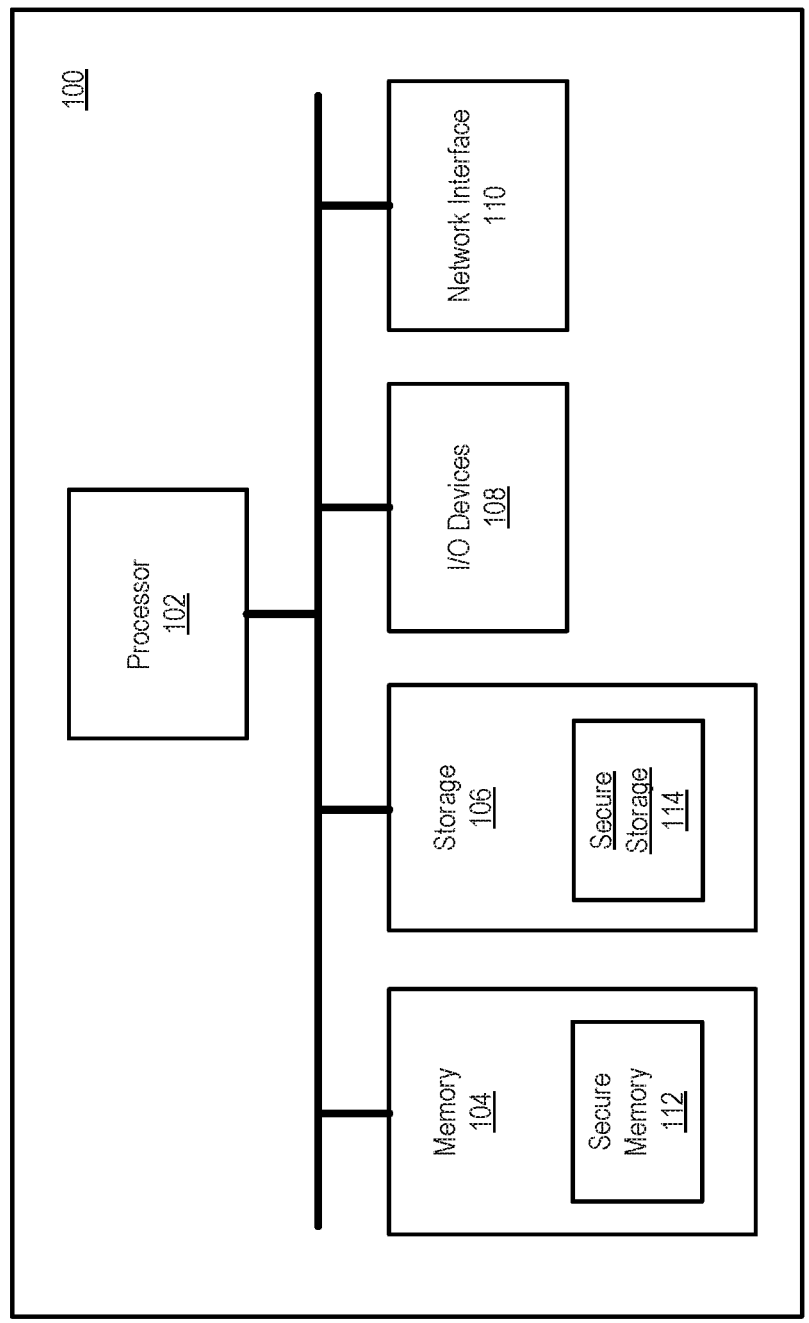
FIG. 1 is a block diagram of a computing device.

FIG. 1 is a schematic diagram of an example computing device 100. Computing device 100 may be, for example, a smart phone, tablet computer, personal computer such as a notebook computer, wearable computing device or the like.

As will be described in further detail, computing device 100 has hardware and software resources divided into multiple execution environments. One execution environment has elevated access restrictions and is used for secure storage and processing of some computing resources.

Computing device 100 includes a processor 102, memory 104, storage 106, one or more input/output (I/O) devices 108, and at least one network interface 110. Components of computing device 100 are formed in one or more semiconductor chips, mounted to a printed circuit board for communication between components. In some embodiments, multiple components, e.g. processor 102 and network interface 110 are incorporated in a single semiconductor chip, referred to as a system-on-chip. In other embodiments, each component is a discrete chip.

Processor 102 is any suitable type of processor, such as a processor implementing an ARM or x86 instruction set.

Memory 104 is any suitable type of random-access memory accessible by processor 102. Memory 104 includes a secure memory 112. In some embodiments, secure memory 112 is a discrete physical module. In other embodiments, memory 104 is segmented to define secure memory within the same physical module as other memory. In some embodiments, secure memory 112 occupies a range of memory addresses within the address space of memory 104. In some embodiments, secure memory 112 is accessible by processor 102 within a different memory space.

Storage 106 may be, for example, one or more modules of NAND flash memory of suitable capacity, or may be one or more hard drives or other persistent computer storage device. Storage 106 includes a secure storage 114. In some embodiments, secure storage 114 resides on a device shared with other storage 106. In other embodiments, secure storage 114 resides on a discrete hard drive, flash storage module or the like.

I/O devices 108 include, for example, user interface devices such as a screen, such as a capacitive or other touch-sensitive screen capable of displaying rendered images as output and receiving input in the form of touches. In some embodiments, I/O devices 108 additionally or alternatively includes one or more of speakers, microphones, sensors such as accelerometers and global positioning system (GPS) receivers, keypads or the like. In some embodiments, I/O devices 108 include ports for connecting computing device 100 to other computing devices. In an example, I/O devices 108 include a universal serial bus (USB) controller for connection to peripherals or to host computing devices.

Network interface 110 is capable of connecting computing device 100 to one or more communication networks. In some embodiments, network interface 110 includes one or more wireless radios, such as Wi-Fi or cellular (e.g. GPRS, GSM, EDGE, CDMA, LTE or the like).

Computing device 100 operates under control of software programs. Computer-readable instructions are stored in storage 106 or secure storage 114, and executed by processor 102 in memory 104 or secure memory 112.

Figure 2:
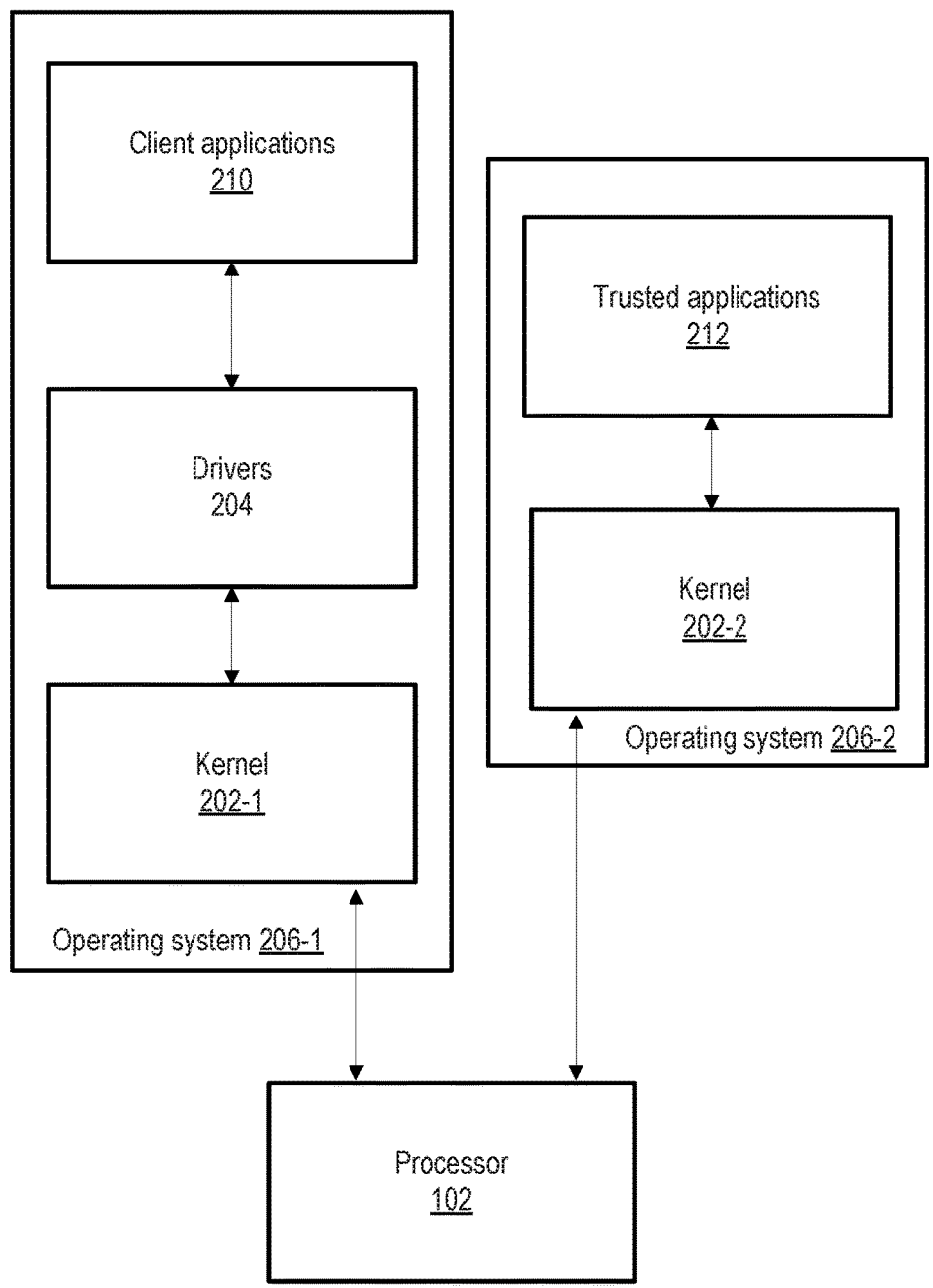
FIG. 2 is a block diagram showing software components at the computing device of FIG. 1.

FIG. 2 is a schematic block diagram showing organization of software at computing device 100. As depicted, computing device 100 has two separate executing environments provided by operating systems 206-1, 206-2 (individually and collectively, operating systems 206). Operating system 206-1 has access to resources in memory 104 and storage 106 (FIG. 1) and operating system 206-2 has access to secure memory 112 and secure storage 114. In the depicted embodiment, processor 102 is configured with logic for maintaining separation between the executing environments provided by operating systems 206-1, 206-2. In an example, processor 102 includes one or more ARM Cortex-A™ cores and includes TrustZone™ technology with secure monitor logic for switching between executing environments. Other implementations are possible. As noted, secure memory 112 may be located in a separate physical memory module from memory 104. Alternatively or additionally, secure memory 112 may be accessible in a different address space or in a different address range. Likewise, secure storage 114 may be located in a separate physical memory device or in a different partition or sector of storage 106.

In an example, operating system 206-1 is a version of Linux. However, operating system 206 can be any operating system capable of running on computing device 100, such as other Linux-based operating systems such as Android, Microsoft Windows Mobile, Ubuntu touch or the like. Operating system 206-2 provides a secure execution environment for storage and access of secure computing resources. Operating system 206-2 provides limited functionality relative to operating system 206-1 and requires fewer computational, storage and memory resources.

Operating system 206-1 hosts one or more client applications 210. Client applications 210 are installable by users, for example, by execution of application packages. Application packages may be retrieved from software repositories or stores, such as the Google Play Store for Android applications, the Apple App Store for iOS applications, the Windows store for Windows applications, and various repositories for applications on distributions of Linux-based operating systems. Alternatively, applications may be obtained and installed from other sources.

Application packages, particularly those distributed through software stores or repositories, typically adhere to standardized formats. Application packages can contain, among others, human or computer-readable code, compiled binaries, application resources such as databases, and metadata identifying properties such as the application name, publisher, compatible file types and the like. For example, Android applications distributed through the Google Play Store are provided in compressed, digitally-signed .apk packages, which include a unique application ID, e.g. "com.publisher.app1".

Operating system 206-2 hosts one or more trusted applications 212. Trusted applications 212 are installed in secure storage 114. Operating system 206-2 is configured so that trusted applications 212 cannot be installed by users without providing credentials for elevated permissions. In an example, secure storage 114 is not writable by end users. Rather, secure storage 114 can be modified only by system-level processes or applications, e.g. as part of updates issued by the manufacturer of computing device 100, or by certain specific digitally signed application packages. Trusted applications 212 are therefore "trusted" in the sense that the installation process ensures that they are verified as legitimate applications from authorized sources.

Each trusted application 212 has access to secure data. For at least some functions, client applications 210 rely on such data. Client applications are therefore able to send requests to trusted applications 212, e.g. for secure data to be returned, or for operations to be performed using secure data.

Sharing of information between trusted applications 212 and client applications 210 is based on rules defining requirements for secure resources, such as access to trusted applications 212 or data stored by trusted applications 212, to be shared with a client application 210.

Because client applications 210 are user-installable, they might not be subject to the same degree of verification prior to installation as trusted applications 212. Accordingly, it is possible for client applications 210 to be installed that are malicious, coded without proper protection of secure data, or associated with entities that are not authorized to access secure data. The term "trust model" refers to protective measures that are taken to guard against access except by authorized applications and users.

Figure 3:
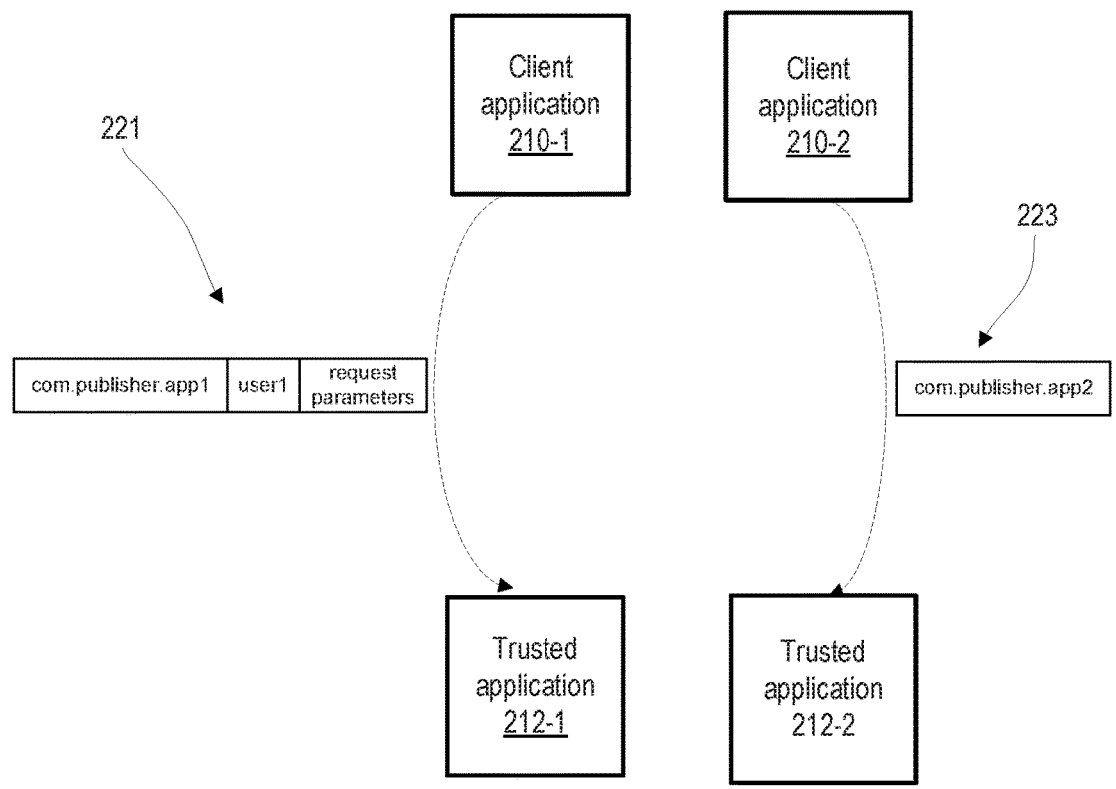
FIG. 3 is a schematic diagram showing a flow of messages between client applications and trusted applications at a computing device.
Figure 4:
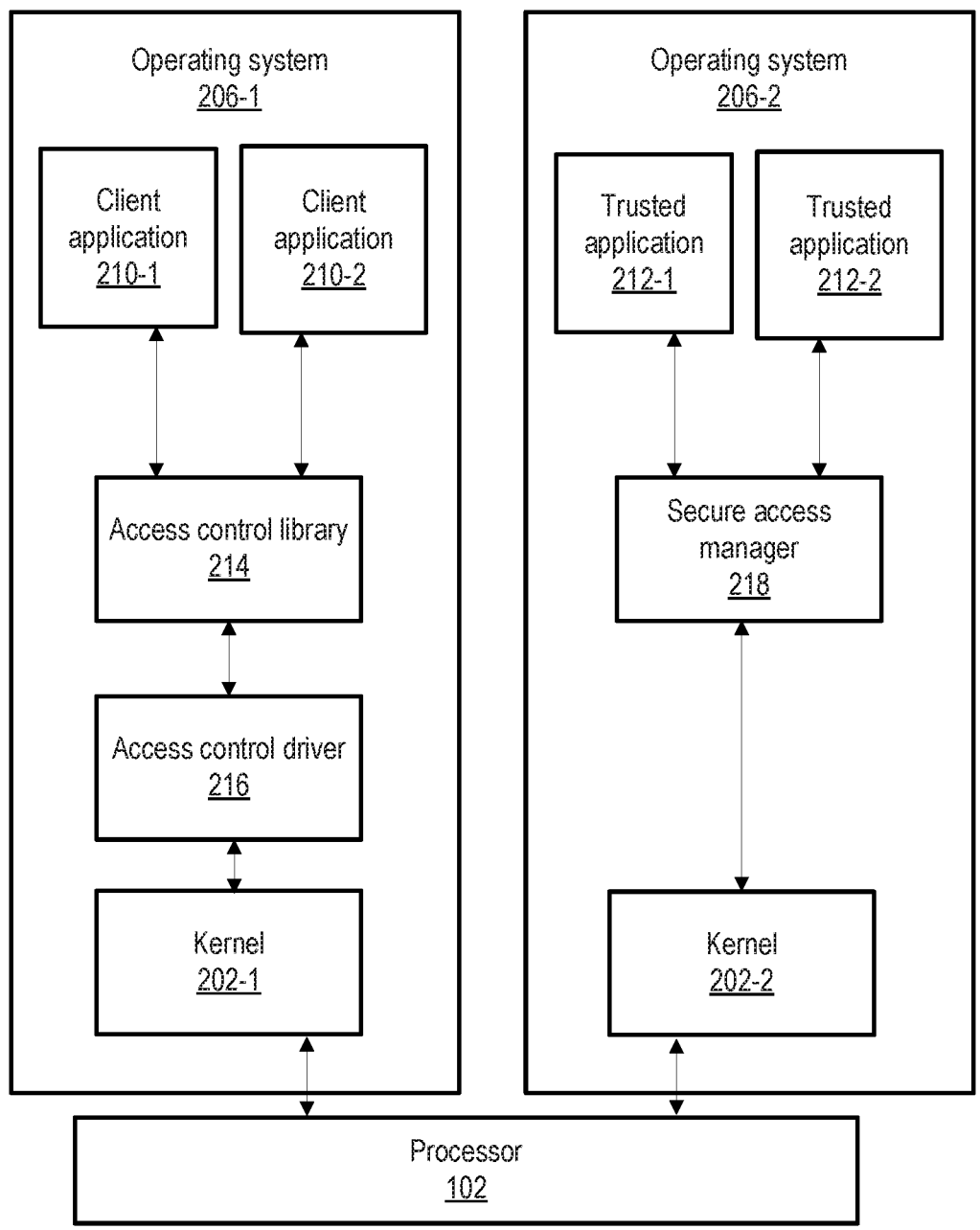
FIG. 4 is a schematic diagram showing another arrangement of software components at the computing device of FIG. 1.

FIG. 3 depicts an example mechanism for permitting controlled access to secure data, for example, exchanging or sharing data between client applications 210 and trusted applications 212. As shown in FIG. 4, two client applications 210-1, 210-2 and two trusted applications 212-1 and 212-2 are present. By way of example, client application 210-1 is a financial payments application and client application 210-2 is a media player with digital rights management functionality. Client application 210-1 periodically requires access to account information such as credit card numbers or associated authorization credentials in order to perform transactions. Client application 210-2 periodically requires access to digital rights management data, such as private encryption keys, in order to play back content.

Trusted application 212-1 is a credential storage utility and trusted application 212-2 is a digital rights management utility. Trusted application 212-1 has access to a data structure (e.g. a database) of financial account information or credentials. Trusted application 212-2 has access to a data structure (e.g. a database) of encryption keys for accessing copy-protected content.

Each of trusted application 212-1 and trusted application 212-2 is configured to receive requests from client applications 210. Trusted applications 212-1, 212-2 are further configured to perform permissions checks in response to receiving such requests. The security checks are configured in view of the type of information stored by each trusted application 212. Specifically, in some embodiments, trusted application 212-1 stores credentials belonging to multiple users. In order to confirm that a request for credentials is authorized, trusted application 212-1 is configured to check the name of the requesting application and the user id of the user making the request. Accordingly, in order to make a request intended for trusted application 212-1, client application 210-1 is configured to construct a message 221 containing its application ID, "com.publisher.app1", the user ID of the active user and one or more parameters defining the request. In contrast, trusted application 212-2 stores encryption keys associated with specific content, rather than any particular user. Accordingly, to confirm that a request is authorized, trusted application 212-2 might check only the application ID of the client application making the request. Therefore, in order to request secure data from trusted application 212-2, client application 210-2 constructs a message 223 containing its application ID, "com.publisher.app1".

Unfortunately, access management by individual trusted applications in this manner has disadvantages. For example, each trusted application 212 needs to be configured to receive some credentials from client applications 210. The credentials required by any given trusted application 212, or the format in which they are required, may vary. Accordingly, developers of client applications 210 would need to be aware of, and customize client applications 210 in view of the configuration of each trusted application 212. Moreover, changes to any trusted application 212 would need to be reflected in any client applications 210 requiring access to the trusted application's data.

In addition, each trusted application 212 might need to maintain an up-to-date record of all authorized client applications 210, e.g. based on application names or IDs. Maintaining such records may be burdensome. Moreover, application names and application IDs are publicly accessible—for example, such information can be extracted from some types of application packages and could therefore be forged by malicious client applications 210, making secure data vulnerable to unauthorized access.

FIG. 4 depicts an embodiment in which control of access to secure data is managed by discrete software modules within operating systems 206-1, 206-2, rather than individual trusted applications 212. Such components allow for standardization of functions for requesting secure data and for enforcing access rules. In addition, such components allow for access credentials to be created and maintained internally at computing device 100, such that access control need not rely on publicly-available and easily forged information.

In particular, operating system 206-1 further includes an access control library 214 such as an application programming interface (API), which provides a set of functions usable by client applications 210 to request secure data from trusted applications 212 or to request performance of operations using secure data by trusted applications 212. In an example, access control library 214 provides a function for passing a request to a trusted application 212. Client applications 210 can invoke the function by constructing requests including parameters such as an identifier of the trusted application 212, an identifier of a function to be performed by the trusted application 212, and other parameters required for authorization or for performance of the function by trusted application 212.

Access control driver 216 maps functions provided by access control library 214 to the corresponding trusted applications 212, for example through a data structure defining concordance of functions to trusted applications 212.

Access control driver 216 and secure access manager 218 have access to data structures 220, 222 (FIGS. 5, 6) cataloguing the client applications 210 installed under operating system 206-1 and trusted applications 212 installed under operating system 206-2. Data structures 220, 222 may be maintained by access control driver 216 and secure access manager 218, respectively. Alternatively, data structures 220, 222 may be maintained by other components of operating systems 206-1, 206-2, respectively.

Figure 5:
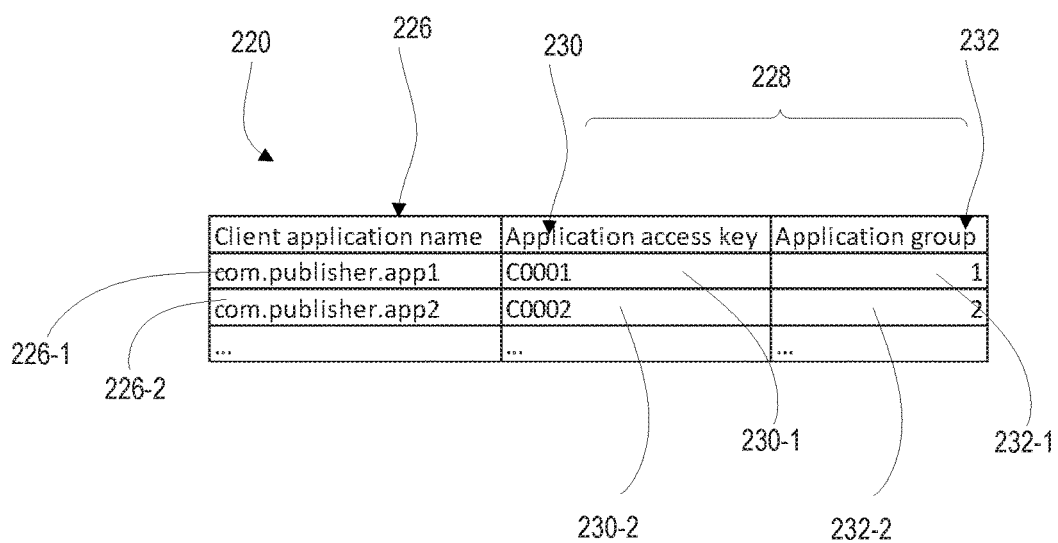
FIG. 5 is a data structure maintained at the computing device of FIG. 1.

FIG. 5 depicts an example data structure 220 cataloguing client applications 210. As shown in FIG. 5, data structure 220 contains an application name field 226 and one or more access credential fields 228. Application name field 226 contains values identifying each application. As shown in FIG. 4, field 226-1 contains identifier "com.publisher.app1" corresponding to client application 210-1 and field 226-2 contains identifier "com.publisher.app2" corresponding to client application 210-2. In the depicted embodiment, access credential fields 228 include an application access key field 230, and an application group ID field 232. However, additional types of access credentials may be used.

Application access key field 230 contains, for each client application 210, a unique identifying value assigned to the client application 210 upon installation. For example, a unique secure access key may be sequentially assigned or derived from the client application name, e.g. using a time-based function, at the time of installation. As depicted, field 230-1 contains secure access key C0001 associated with client application 210-1 and field 230-2 contains secure access key C0002 associated with client application 210-2.

Application group field 232 contains, for at least some client applications 210, one or more values defining groups to which the client applications 210 belong. Application groups can include, for example, applications installed by a particular user, applications from a particular developer or publisher, functional groupings (e.g. banking applications, media applications), or any other suitable grouping. Group values can be assigned based on metadata in application packages, instructions from the user, rules in operating system 206-1 or access control driver 216, or the like. As shown, client application 210-1 belongs to group "1" and client application 210-2 belongs to group "2". In the depicted example, group "2" corresponds to a set of media applications using a common digital rights management platform, provided by trusted application 212-2. Applications belonging to the group may include media player applications associated with different content vendors. In the depicted example, each of client applications 210-1, 210-2 belongs to one group. However, it is possible for some applications to belong to multiple groups and for other applications to belong to no groups.

A record is added to data structure 220 for each client application 210 upon installation of the client application 210.

Figure 6:
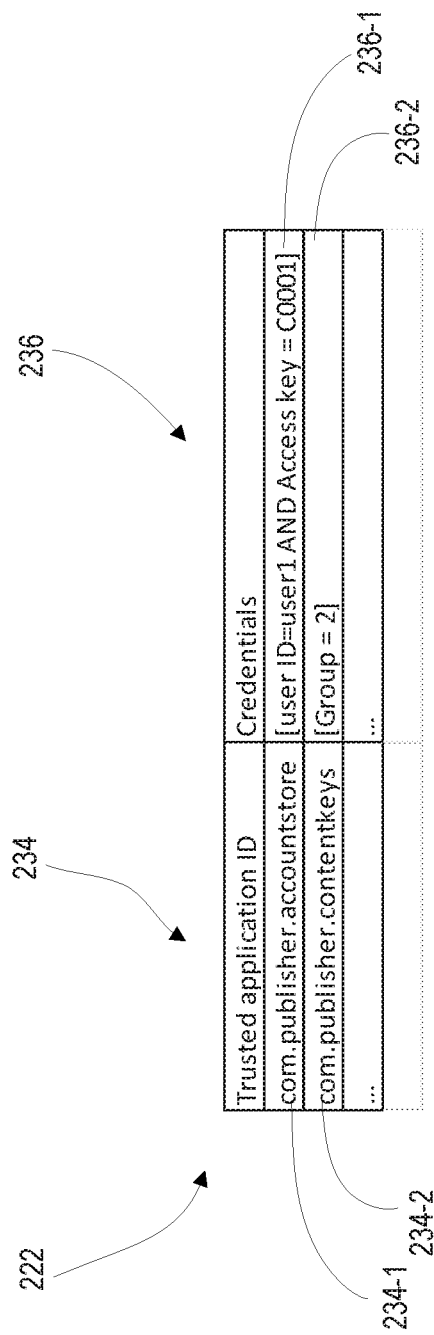
FIG. 6 is a schematic diagram showing a data structure maintained at the computing device of FIG. 1.

FIG. 6 depicts an example data structure 222 maintained by secure access manager 218 cataloguing trusted applications 212 and containing bindings of trusted applications 212 with access credentials of authorized client applications 210.

Data structure 222 includes a trusted application field 234 containing application ID values for each trusted application 212. As depicted, trusted application field 232-1 contains a value, com.publisher.accountstore, which identifies the trusted application 212-1 responsible for maintaining payment and account credentials. Trusted application field 232-2 contains a value, com.publisher.contentkeys, which identifies the trusted application 212-2 responsible for maintaining digital rights information for media content. Data structure 222 further includes a required credentials field 236 containing credential values or combinations of credential values required for accessing the trusted application. As shown, field 236-1 contains an expression specifying that both a user ID of "user1" and an application access key of "C0001" (corresponding to client application 210-1) are required to access trusted application 212-1. Field 236-2 contains an expression specifying that a group value of "2" is required to access trusted application 212-2. Thus, client applications 210 identified as belonging to that group are authorized.

In some cases, it may be possible to access a trusted application 212 with multiple credentials or multiple combinations of credentials. For example, more than one user may be authorized to access a particular trusted application 212, in which case credentials associated with any authorized user may be sufficient to gain access to the trusted application 212. In such cases, the possible combinations could be entered as delimited values in a single field. For example, a field could contain multiple delimited user ID values. Alternatively, each combination could be entered in a discrete field.

Data structure 222 is depicted in FIG. 6 as a table. However, other structures are possible, as will be apparent to skilled persons from the present disclosure. For example, data structure 222 could be implemented as multiple tables of a database.

Data structure 222 is stored in secure storage 114 and therefore can only be modified by secure access manager 218 or other components of operating system 206-2. In some embodiments, secure access manager 218 is configured to modify data structure 222 only based on system-level instructions or instructions from specific digitally-signed application packages. Without limitation, updates to data structure 222 can occur on installation of client applications 210 or trusted applications 212; as part of system-level software updates issued, for example by the manufacturer of computing device 100; uninstallation of applications; or resetting computing device 100.

In some embodiments, access control driver 216 (FIG. 4) further maintains a record of parameters used to authorize access to each trusted application 212. In the depicted example, access control driver records that trusted application 212-1 can use the application access key and active user ID to authorize a request and that trusted application 212-1 uses only the application access key. In such embodiments, access control driver 216 constructs messages intended for particular trusted applications 212 based on the parameters required to authorize the message. Alternatively, access control driver 216 can include all available parameters with all messages intended for trusted applications 212.

In some embodiments, at least some client applications 210 are installed concurrently with their corresponding trusted applications 212 and data structures 220, 222 are updated accordingly. For example, in some embodiments, media playback client application 210-2 and copy-protection trusted application 212-2 are contained in the same application package. Upon execution of the application package by a user, both of client application 210-2 and trusted application 212-2 are installed. Access control driver 216 assigns an application access key to the client application 210-2 and provides instructions to secure access manager 218 to add a record to data structure 222 linking trusted application 212-2 with the assigned secure access key, so that client application is authorized to access secure data from trusted application 212-2.

Alternatively or additionally, trusted applications 212 can be pre-installed, e.g. by the manufacturer of computing device 100. In such cases, an application package containing a client application 210 which requires access to the trusted application 212 also contains instructions for updating data structure 222 to grant access rights to the client application 210. Access control driver 216 processes the instructions and validates the application package as being authorized to modify data structure 222, and passes the modification instructions to secure access manager 218.

Figure 7:
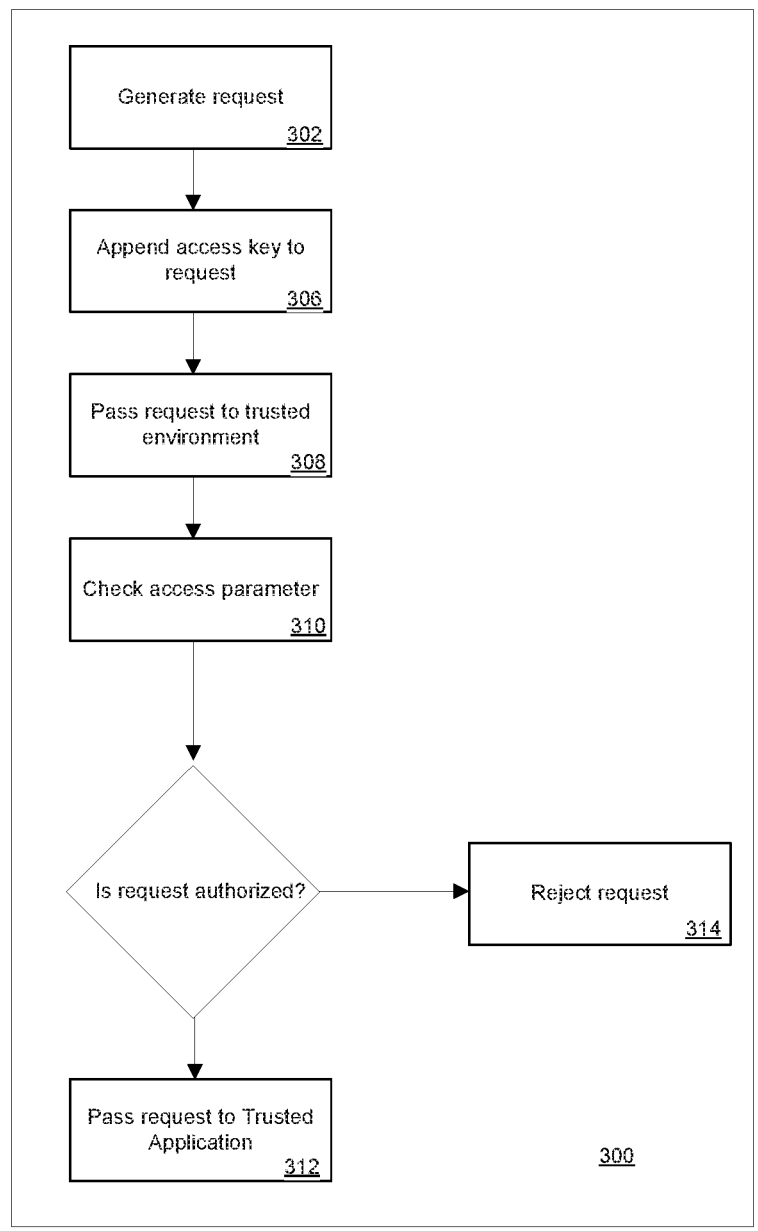
FIG. 7 is a flow chart showing a method of sending a request to a trusted application.
Figure 8:
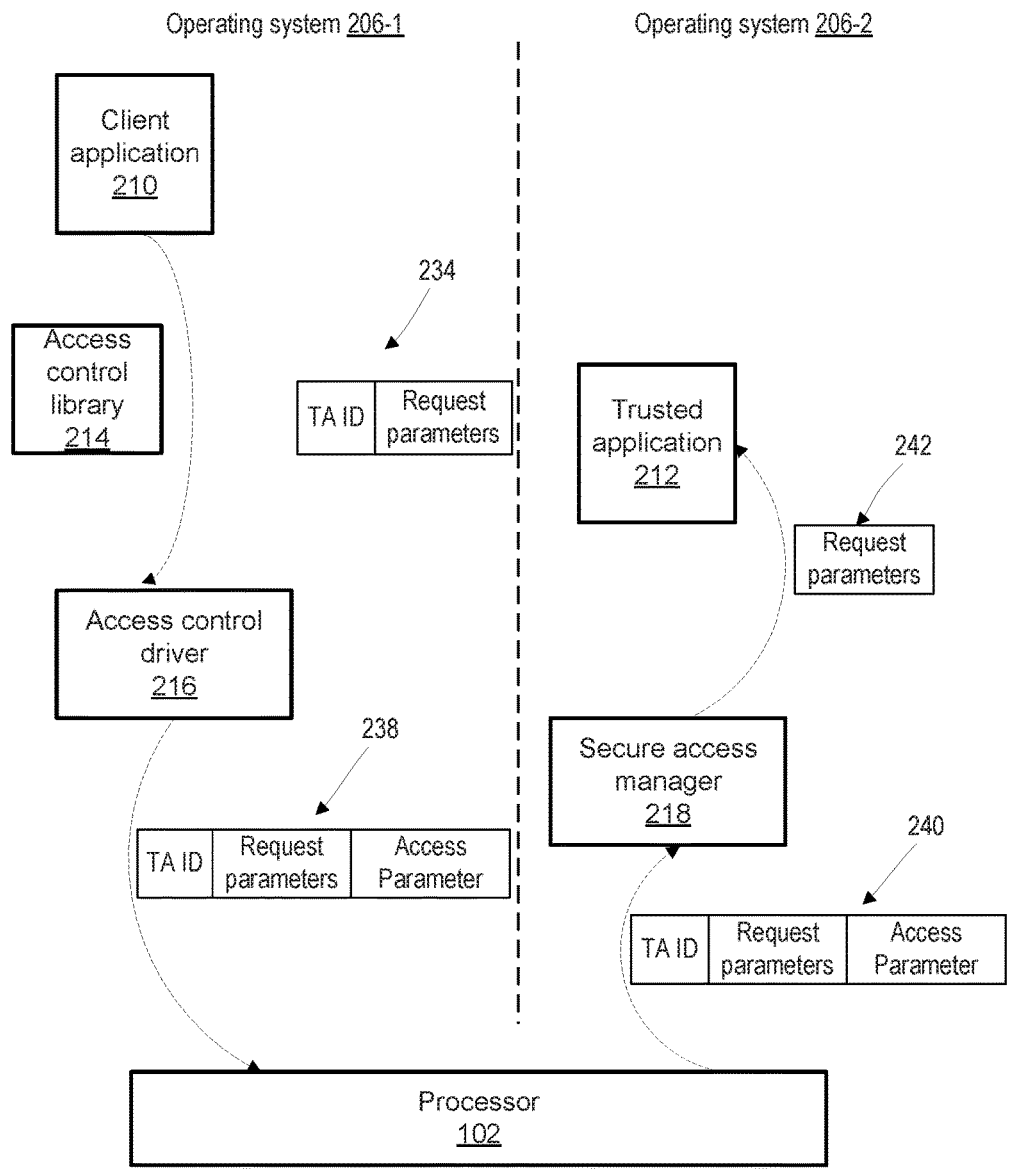
FIG. 8 is a message flow diagram showing messages sent in the method of FIG. 7.

FIG. 7 is a flow chart showing a method 300 of managing access to secure data, performed at computing device 100. FIG. 8 is a schematic diagram showing example messages exchanged among components of computing device 100 in the method of FIG. 7.

At block 302, client application 210-1 requests access to secure data. In particular, the client application 210 calls a function provided by access control library 214 for sending requests to trusted applications 212. The client application 210 constructs a message 234 (FIG. 8) containing an identifier of the trusted application 212 for which the request is intended, and parameters defining the request, as indicated by message 234 in FIG. 7.

The request may be a read request, i.e. a request for secure data to be returned. In such cases, the parameters included in message 234 define the data required. For example, a user of computing device 100 enters an input instructing client application 210-1 to present the user's credit card credentials at a point of sale. Client application 210-1 constructs a message 234 including request parameters such as (READ, CARD1), indicating that the request is a read request and that CARD1 is the data to be retrieved.

Alternatively, the request may be a write request i.e. a request to store data in secure storage 114. For example, a user of computing device 100 enters an account number into client application 210-1 for storage, in which case client application 210-1 constructs a message including request parameters such as (WRITE, [account type], [account no.]), indicating that the request is a write request and defining the type of account and number to be saved.

Alternatively, the request may be a request for performance of an operation by trusted application 212, such as encryption or decryption of data. In such cases, the parameters included in message 234 define the data to be encrypted or decrypted, and optionally, parameters for identification of an encryption key or method.

At block 306, access control driver 216 determines the types of access parameters required for accessing the relevant trusted application 212 and looks up those access parameters associated with the client application 210 from which the request originated. For example, as noted, trusted application 212-1, housing payment credentials, requires an application access key to confirm that the requesting client application 210 is authorized and a user ID to confirm that the active user is authorized to access the requested account data. Some access parameters, e.g. application access keys, are retrieved by reading data structure 220. Additional access parameters, e.g. user ID, can be provided by operating system 206-1 or the requesting client application 210. Access control driver 216 forms a request 238 (FIG. 8) including an identifier of the relevant trusted application 212, the appropriate access parameters identified by access control driver 216, and the request parameters received from client application 210.

At block 308, request 238 is passed to operating system 206-2 via processor 102. Specifically, as shown in FIG. 8, a message 240 is passed to secure access manager 218 identifying the relevant trusted application 212-1 and containing the parameters defining the data or operation requested and the access parameter, namely secure access key 228-1.

At block 310, secure access manager 218 evaluates message 240. In particular, secure access manager 218 performs a lookup of the trusted application 212 by reading data structure 222 and determines whether the combination of access parameters in message 240 appears in a corresponding field 236. If the combination of parameters in message 240 matches a combination of parameters in a corresponding field 236, a communications session is created between the client application 210 which originated the request and the trusted application 212 targeted by the request.

If, as in the depicted example, the received combination of access parameters matches a combination listed in field 236 for the trusted application 212 identified in message 240, the requesting client application 210 is authorized to access the secure data requested. Secure access manager 218 passes a message 242 to the trusted application 212 containing the parameters defining the request.

If the received combination of access parameters does not match a combination associated with the trusted application 212 in data structure 222, the request is not authorized. For example, the user or client application 210 originating the request may not be authorized to access the secure data or perform the operation requested. If so, at block 314, the request is rejected, that is, secure access manager 218 does not pass the request to the trusted application 212. Optionally, an error message may be returned.

Figure 9:
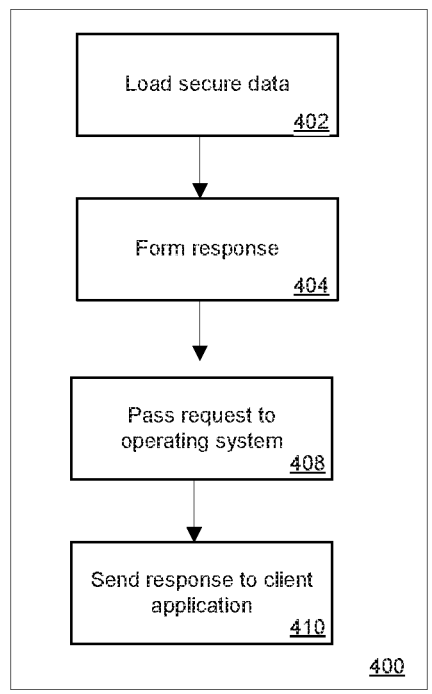
FIG. 9 is a flow chart showing a method of responding to a request.
Figure 10:
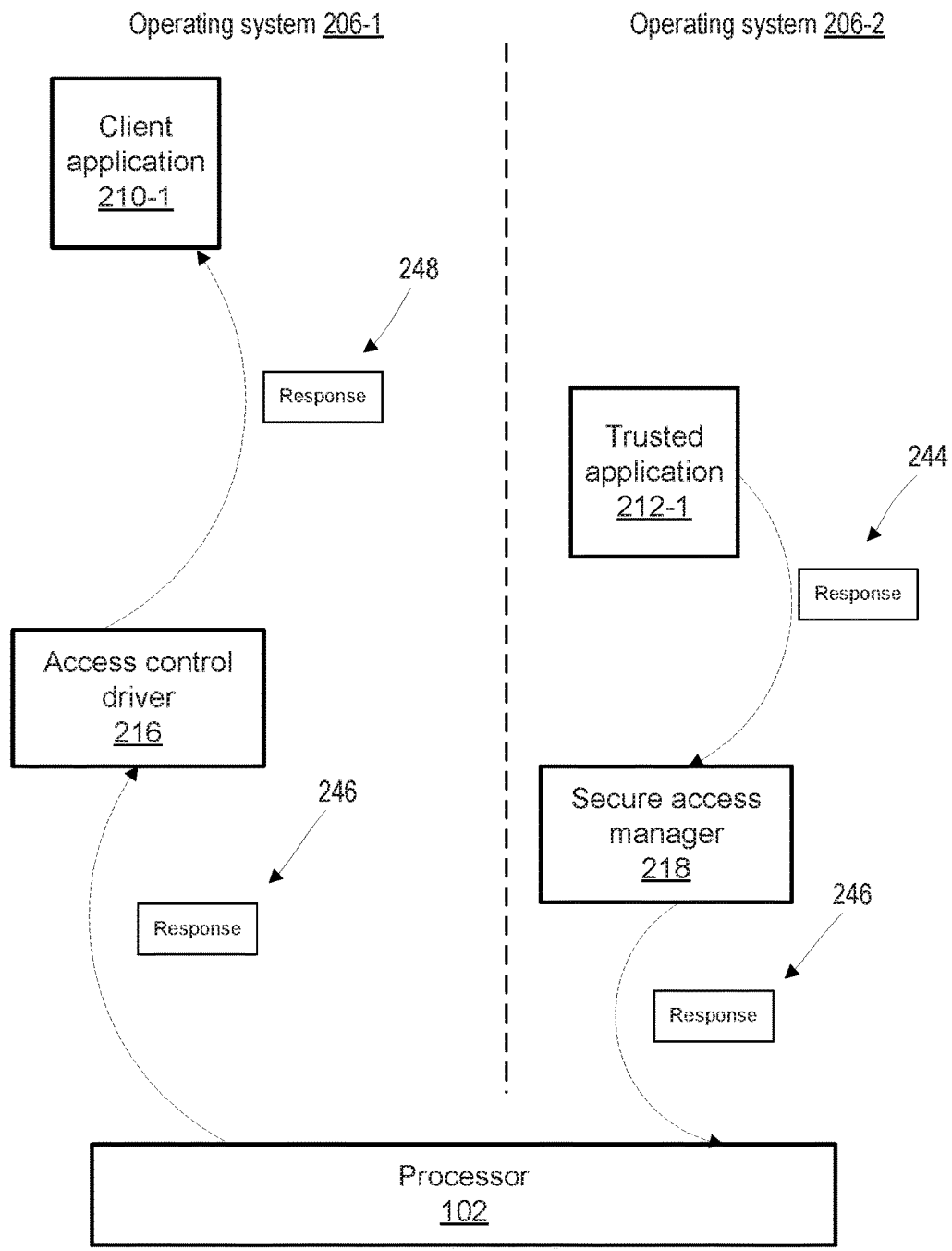
FIG. 10 is a message flow diagram showing messages sent in the method of FIG. 9.

If an authorized request is a write request, trusted application 212 writes the received data to secure storage 114. Alternatively, if an authorized request is a read request, trusted application 212 retrieves the requested data for returning to client application 210 in operating system 206-1. If an authorized request is for performance of an operation, e.g. encryption or decryption of data, trusted application 212 performs the application. FIG. 9 depicts a method 400 of returning secure data from a trusted application 212 to a client application 210. FIG. 10 depicts messages sent among components of computing device 100 during method 400.

At block 402, a trusted application 212 carries out the request. For example, the trusted application 212 obtains the secure data requested by client application 210-1. As depicted in FIG. 9, the trusted application 212 retrieves data from secure storage 114 and returns the data to client application 210. In other examples, the trusted application 212 writes data received in the request. In still other examples, the trusted application 212 performs an operation, e.g. uses secure data to derive a response. For example, an encryption key may be retrieved from secure storage 114 and used to generate a decrypted value to be returned to a client application 210.

At block 404, trusted application 212 generates a response 244 to be returned to the client application 210 and sends the response to secure access manger 218. The message is passed to secure access manager 218.

At block 408, secure access manager 218 sends a message 246 (FIG. 10) to including the response contents to operating system 206-1 by way of processor 102. In particular, secure access manager sends message 246 to access control driver 216.

At block 410, access control driver 216 sends a message 248 including the response contents to the client application 210.

As described with reference to the embodiments FIGS. 4-10, control of access to trusted applications 212 and to secure data stored by trusted applications 212 is centrally managed by secure access manager 218 in concert with and using information provided by access control library 214 and access control driver 216. Access control measures need not be implemented by either of client applications 210 or trusted applications 212. Rather, client applications 210, 212 can simply define the desired access controls, e.g. using metadata in application packages, and rely on access control library 214, access control driver 216 and secure access manager 218 to implement such controls. Access control library 214, access control driver 216 and secure access manager 218 reflect the desired access rules in data structures 220, 222.

Centralized implementation of access control in this manner allows for standardization of access controls among client applications 210, trusted applications 212. For example, code to limit access to specific client applications or users is implemented in access control driver 216 and secure access manager 218, and client applications 210, trusted applications 218 can simply rely on the access control driver 216 and secure access manager 218 for such functions. Thus, vulnerabilities associated with incorrect implementations by individual applications can be avoided. Moreover, in the event of a security vulnerability being identified, the vulnerability can be addressed for all applications by updating one or more of access control library 214, access control driver 216 or security access manager 218. In contrast, if access controls were implemented by individual client applications 210 or trusted applications 212, addressing vulnerabilities could require updating every application.

Handling of access control functions by operating system components, e.g. access control library 214, access control driver 216 and secure access manager 218, also eases development of client applications 210 and trusted applications 212, as developers of individual applications need not implement custom access controls in each application. Ease of development may tend to encourage the development of applications that utilize secure memory 112 and secure storage 114 and therefore may contribute to the expansion of capabilities of computing devices such as computing device 100.

As described above with reference to FIG. 8, each request generated by a client application 210 includes an identification of the trusted application 212 for which the request is intended. Client applications 210 are aware of trusted applications 212 with which they are designed to interact. That is, client applications 210 are programmed to rely on trusted applications 212 to for some data or for performance of some operations, and to form requests identifying those trusted applications and including the relevant parameters. In other embodiments, access control library 214 may provide multiple functions, specific to types of data available from trusted applications 212 and types of operations that can be performed by trusted applications 212. In such embodiments, access control library 214 further maintains a concordance between each function and the respective trusted application, and defines the parameters required for each function, each as part of an API. Thus, client applications 210 can be configured to rely on functions provided by access control library and need not explicitly identify trusted applications 212.

In some embodiments, components and features of the systems and methods disclosed herein can be implemented according to Global Platform Trusted Execution Environment (TEE) specifications, accessible on the internet at www.globalplatform.org/specificationsdevice.asp. For example, in some embodiments, mobile computing device 100 is compliant with Global Platform TEE System Architecture v1.0 and operating system 206-2 is compliant with the trusted execution environment specifications defined therein. Moreover, in some embodiments, operating systems 206-1, 206-2 and computing device 100 implement Global Platform TEE API specifications such as TEE Client API Specification v1.0 and TEE Internal Core API Specification v1.1.1.1 and communication between operating system 206-1 and operating system 206-2 occurs according to such specifications, all of which are incorporated herein by reference. The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the detailed embodiments described above and illustrated are intended to be examples only. Modifications are possible. The invention is defined by the claims.

What is claimed is:

1. A computing device, comprising:
   a first memory;
   a second secure memory;
   a processor configured to execute:
      a first operating system in a rich execution environment of the processor, the first operating system having access to said first memory; and a second operating system in a trusted execution environment of the processor, the second operating system having access to said second secure memory, said second secure memory not accessible by client applications hosted by said first operating system, said second operating system hosting one or more trusted applications;

a first software module executable in said first operating system for receiving an access request from a requesting client application of said client applications to access one of said trusted applications and passing said access request to a second software module executable within said second operating system after adding access credentials assigned to the requesting client application to said access request;

a first data structure including said access credentials assigned to said requesting client application, and wherein said first software module is configured to retrieve said access credentials from said first data structure and add said access credentials assigned to said requesting client application to said access request;

the second software module executable in said second operating system for receiving, from said software module, said access request with said access credentials and passing said access request to said one of said trusted applications in response to determining that said access request is authorized based on said access credentials; and a second data structure including access requirements corresponding to said one of said trusted applications, wherein said second software module is configured to determine that said access request is authorized based on said access credentials by comparing said access credentials in said access request to said access requirements for said one of said trusted applications, and pass said access request to said one of said trusted applications when said access requirements matches said access credentials.

2. The computing device of claim 1, wherein said access request comprises a request for return of secure data stored in said second secure memory from said one of said trusted applications hosted by said second operating system.

3. The computing device of claim 1, wherein said access request comprises a request for said one of said trusted applications to perform one or more operations using secure data stored in said second secure memory.

4. The computing device of claim 1, wherein said access credentials assigned to said requesting client application comprise a value assigned to said requesting client application at a time of installation of said requesting client application.

5. The computing device of claim 4, wherein said value is an identification value generated at the time of installation.

6. The computing device of claim 1, wherein said access credentials assigned to said requesting client application comprise a group value assigned to a group of the client applications.

7. The computing device of claim 1, wherein said second data structure further includes said access requirements corresponding to each of said trusted applications.

8. The computing device of claim 7, wherein said first data structure further includes said access credentials assigned to each respective client application at the time of installation of the respective client application.

9. A method of access control on a computing device comprising a first operating system in a rich execution environment having access to a first memory, and a second operating system in a trusted execution environment having access to a second secure memory not accessible by client applications hosted by said first operating system, said second operating system hosting one or more trusted applications, the method comprising:

at a first software module in said first operating system:

receiving a request to access one of said trusted applications from a requesting client application of said client applications in said first operating system;

retrieving, from a first data structure, access credentials assigned to said requesting application;

adding said access credentials assigned to said requesting client application to said request; and passing said request with said access credentials to a second software module executable within said second operating system;

at said second software module in said second operating system:

receiving said request with said access credentials from said first operating system;

determining that said access request is authorized based on said access credentials by retrieving access requirements corresponding to said one of said trusted applications from a second data structure, comparing said access credentials in said access request to said access requirement corresponding to said one of said trusted applications; and passing said request to said one of said trusted applications in response to determining that said request is authorized based on said access credentials matching said access requirements.

10. The method of claim 9, wherein said request comprises a request for return of data stored in said second secure memory from said one of said trusted applications hosted by said second operating system.

11. The method of claim 9 wherein said request comprises a request for one of said trusted applications to perform one or more operations using data stored in said second secure memory.

12. The method of claim 9, wherein said access credentials assigned to said requesting client application comprise an identification value associated with said requesting client application.

13. The method of claim 9, wherein said access credentials assigned to said requesting client application comprise a group value assigned to a group of the client applications.

14. The method of claim 9, comprising assigning access credentials to each of said client applications in said first operating system at a time of installation, and writing said access credentials assigned to each of said client applications to a first data structure.

15. A computer-readable medium, having instructions thereon for execution by a processor, said instructions causing the processor to perform a method of access control on a computing device comprising a first operating system executing in a rich execution environment of the processor, said first operating system having access to a first memory, and a second operating system executing in a trusted execution environment of the processor, said second operating system having access to a second secure memory not accessible by client applications hosted by said first operating system, said second operating system hosting one or more trusted applications, the method comprising:

at a first software module in said first operating system:

receiving an access request from a requesting client application of said client applications to access one of said trusted applications;

retrieving, from a first data structure, access credentials assigned to said requesting application;

adding said access credentials to said access request based on said requesting application; and passing said access request and said access credentials to a second software module executable within said second operating system;

at said second software module in said second operating system:

receiving said access request with said access credentials from said first operating system;

determining that said access request is authorized based on said access credentials by retrieving access requirements corresponding to said one of said trusted applications from a second data structure, comparing said access credentials in said access request to said access requirement corresponding to said one of said trusted applications; and passing said request to said one of said trusted applications in response to determining that said request is authorized based on said access credentials matching said access requirements.

16. The computing device of claim 1, wherein said access request comprises a request to store data in said second secure memory.

17. The method of claim 9, wherein said access request comprises a request to store data in said second secure memory.

* * * * *